US011619553B2

(12) United States Patent
Maunumäki et al.

(10) Patent No.: US 11,619,553 B2
(45) Date of Patent: Apr. 4, 2023

(54) ADVANCED SAFETY MECHANISMS IN AN INTELLIGENT DRY BLOCK CALIBRATOR

(71) Applicant: Beamex Oy Ab, Pietarsaari (FI)

(72) Inventors: Taija Maunumäki, Kokkola (FI); Mats Byggmästar, Pietarsaari (FI)

(73) Assignee: BEAMEX OY AB, Pietarsaari (FI)

( * ) Notice: Subject to any disclaimer, the term of this patent is extended or adjusted under 35 U.S.C. 154(b) by 348 days.

(21) Appl. No.: 17/080,541

(22) Filed: Oct. 26, 2020

(65) Prior Publication Data

US 2021/0123820 A1  Apr. 29, 2021

(30) Foreign Application Priority Data

Oct. 28, 2019  (FI) ...................... 20195923

(51) Int. Cl.
*G01K 15/00* (2006.01)
(52) U.S. Cl.
CPC ......... *G01K 15/002* (2013.01); *G01K 15/005* (2013.01)
(58) Field of Classification Search
CPC ........................ G01K 15/002; G01K 15/005
See application file for complete search history.

(56) References Cited

U.S. PATENT DOCUMENTS

| 8,483,986 | B2* | 7/2013 | Riho | G11C 7/1084 |
| | | | | 702/65 |
| 2007/0290871 | A1 | 12/2007 | Farley et al. | |
| 2009/0064603 | A1 | 3/2009 | James et al. | |
| 2009/0121033 | A1 | 5/2009 | Sjogren et al. | |
| 2012/0149971 | A1* | 6/2012 | Jeevanandam | A61M 60/554 |
| | | | | 600/17 |
| 2015/0323806 | A1* | 11/2015 | Arroyo | A61B 5/6831 |
| | | | | 73/514.01 |
| 2015/0338289 | A1 | 11/2015 | Friedrichs | |
| 2021/0010876 | A1* | 1/2021 | Zhao | G01K 15/005 |

FOREIGN PATENT DOCUMENTS

EP           3379221 A1      9/2018

OTHER PUBLICATIONS

Exetended European Search Report, Application No. EP20203757.8 dated Apr. 21, 2021 (10 pages).
Search Report for Finnish Application No. 20195923 dated May 20, 2020.

* cited by examiner

*Primary Examiner* — Gail Kaplan Verbitsky
(74) *Attorney, Agent, or Firm* — Thomas | Horstemeyer, LLP

(57) ABSTRACT

The present invention discloses a temperature calibrator, which comprises or has an externally attached inclination angle sensing means. A temperature sensor and an internal battery is applied as well, together with a fan. The temperature calibrator comprises regular heating elements, a processor, and a User Interface. The system measures the inclination angle and internal temperature of the temperature calibrator. If the angle or temperature value or both exceed a certain threshold value, the system is configured to switch off the heating elements immediately, and to show or send a warning indicator or signal to the user or manager of the device via the UI 22, e.g. through a red LED light, a beeping sound or a warning message on the screen of the temperature calibrator or of the remote device.

13 Claims, 2 Drawing Sheets

ADVANCED SAFETY MECHANISMS IN AN INTELLIGENT DRY BLOCK CALIBRATOR

CROSS-REFERENCE TO RELATED APPLICATION

This application claims benefit of and priority to Finnish Application No. 20195923, filed, Oct. 28, 2019. The entire content of which is incorporated herein by reference.

TECHNICAL FIELD

The present invention relates to temperature calibrators i.e. dry blocks, which can be widely used in various industrial processes and plants, for instance. The present invention especially relates to safety mechanisms, applied when the dry block reaches high temperatures for some reason.

BACKGROUND

Temperature calibrators are multi-purpose measurement units which can be manufactured e.g. for industrial field use, and they can be manufactured as relatively small units to be carriable around a plant or any other area where measurements are required. Temperature calibrators can also be called as dry blocks or dry block calibrators, meaning exactly the same. Temperature calibrators may be manufactured in different temperature range variations, e.g. by having a dry block which is suitable for calibrating temperatures of −25° C. . . . +150° C., and another dry block for calibrating temperatures of +50° C. . . . +660° C., to merely give some examples on different temperature range options.

U.S. Pat. No. 10,209,142 ("Friedrichs") discloses a temperature calibrator and a method of heating and cooling the temperature calibrator. The device has an insert where the temperature sensors to be calibrated can be placed. It comprises magnetocaloric material, and magnetic field generating device, allowing rapid temperature changes within the calibrator. Friedrichs mentions the use of a Peltier element for heating and/or cooling a specific target within the calibrator.

In a high-temperature dry block, the temperature can be high enough to cause serious burns and injuries if exposed to the user. Also, if the heat protection system within the dry block does not work as planned, temperature inside the device can be high enough to damage other parts of the device. In other words, while dry blocks may obtain very high temperatures indeed during their usage, there has not been considered that many practical safety mechanisms which would make the heated dry blocks safer, and e.g. less prone to e.g. igniting fires or other damage within the device itself. This is a major problem in the prior art concerning temperature calibrators reaching high temperatures. On the other hand, electrical safety standards IEC/EN 61010-1, 61010-2-010, 61010-2-030 (in Europe, and corresponding standards in other areas of the world) relevant to the dry block systems already require various safety mechanisms to prevent injury and fire. These standards can be considered quite comprehensive. However, in practice, sophisticated safety solutions are not that common in prior art dry blocks according to our knowledge.

SUMMARY OF THE INVENTION

The present invention introduces in its first aspect a method of sensing a safety hazard within or related to a temperature calibrator (11), and informing the safety hazard to a user (23) or manager (24) of the temperature calibrator (11). The method is characterized in that the method comprises the step of:

sensing at least one of an inclination angle of a housing of the temperature calibrator (11) or temperature within or on the housing of the temperature calibrator (11), and if at least a sensed inclination angle or temperature exceeds a predetermined threshold value indicating a possible safety hazard, switching off heating elements (19) within the temperature calibrator (11), and showing a warning information either locally on the temperature calibrator (11) or via a remote device (25) accessed by the user (23) or the manager (24) of the temperature calibrator (11).

In its second aspect, the present invention introduces a system of sensing a safety hazard within or related to a temperature calibrator (11), and informing the safety hazard to a user (23) or manager (24) of the temperature calibrator (11), wherein the system comprises the temperature calibrator (11), comprising heating elements (19). The system is characterized in that the system further comprises:

inclination angle sensing means (14) for sensing an inclination angle of a housing of the temperature calibrator (11), a temperature sensor (15) for sensing temperature within or on the housing of the temperature calibrator (11), and if at least a sensed inclination angle or temperature exceeds a predetermined threshold value indicating a possible safety hazard, the system is configured to switch off the heating elements (19) within the temperature calibrator (11), and the system is configured to show a warning information either locally on the temperature calibrator (11) or via a remote device (25) accessed by the user (23) or the manager (24) of the temperature calibrator (11).

In its third aspect, the present invention introduces a temperature calibrator (11) for sensing a safety hazard within or related to a temperature calibrator (11), and informing the safety hazard to a user (23) or manager (24) of the temperature calibrator (11), wherein the temperature calibrator (11) comprises heating elements (19). The temperature calibrator (11) is characterized in that the temperature calibrator (11) further comprises or is in connection to:

inclination angle sensing means (14) for sensing an inclination angle of a housing of the temperature calibrator (11), a temperature sensor (15) for sensing temperature within or on the housing of the temperature calibrator (11), and if at least a sensed inclination angle or temperature exceeds a predetermined threshold value indicating a possible safety hazard, the temperature calibrator (11) is configured to switch off the heating elements (19), and the temperature calibrator (11) is configured to show a warning information either locally on the temperature calibrator (11) or by transmitting the warning information to a remote device (25) accessed by the user (23) or the manager (24) of the temperature calibrator (11).

In its fourth aspect, the present invention introduces a computer program for sensing a safety hazard within or related to a temperature calibrator (11), and informing the safety hazard to a user (23) or manager (24) of the temperature calibrator (11), the computer program comprising program code and executable in a processor (21). The computer program is characterized in that the computer program is configured to execute the steps of:

sensing at least one of an inclination angle of a housing of the temperature calibrator (11) or temperature within or on the housing of the temperature calibrator (11), and if at least a sensed inclination angle or temperature exceeds a predetermined threshold value indicating a possible safety hazard, switching off heating elements (19) within the temperature calibrator (11), and showing a warning information either locally on the temperature calibrator (11) or via a remote device (25) accessed by the user (23) or the manager (24) of the temperature calibrator (11).

Various embodiments are disclosed in dependent claims and in the detailed description below.

DETAILED DESCRIPTION OF THE INVENTION

A starting point in the present invention is discussed first based on emerged issues during research of the dry blocks. One of the issues was with an internal battery, which had the lowest maximum (usage) temperature of all parts in the device. There can also be e.g. a fan, air guiding tunnels and side panels, all made of plastic, that could melt or catch fire if hot convective air started flowing in the wrong way. There was a need for active systems which could react properly in case of overheat within the dry block. Also, having a lithium battery inside a device, which may generate heat up to 660° C., is rather dangerous in the first place.

Therefore, in an intelligent temperature calibrator (i.e. a dry block) with internal heating mechanisms for heating and cooling, many safety risks can be lowered by implementing advanced safety mechanisms. The purpose of the present invention is to lower the risks even more than what is required by the safety standards. The present invention handles these safety issues with various embodiments discussed in the following.

One risk for the temperature calibrator is that the temperature calibrator is caused to lie sideways, either by setting it intentionally in that way or if someone accidentally pushes the device to fall into a sideways position. The intentional setting relates to a situation of "clever users", who might try to calibrate sensors sideways by tilting the dry block on its side, if the sensors are difficult to be placed in the insert in an upright standing position. This can cause hot convective airflows within the calibrator to flow in an unpredicted and unusual manner and in the worst case, this can ignite fire. It is also possible that if the temperature calibrator falls, its hot parts may touch flammable objects or surfaces that could cause fire. If the orientation of the temperature calibrator (i.e. a tilt angle) can be detected, some actions can be taken before a potentially hazardous situation would even occur.

In an embodiment of the present invention, a system comprising the temperature calibrator comprises a measurement device for sensing the inclination angle of the housing of the temperature calibrator. In other words, methodwise, such a measurement device measures the tilt or inclination angle of the housing of the temperature calibrator in relation to the earth's gravity field, and the method will stop heating of the temperature calibrator if the temperature calibrator is not standing in an upright position.

In an embodiment, the measuring of the inclination angle of the housing of the temperature calibrator can be achieved by using an accelerometer or by using a plurality of accelerometers. The accelerometer can be an internal element within the housing of the temperature calibrator, but it can be also attached on the surface of the housing of the temperature calibrator.

Figure 1:
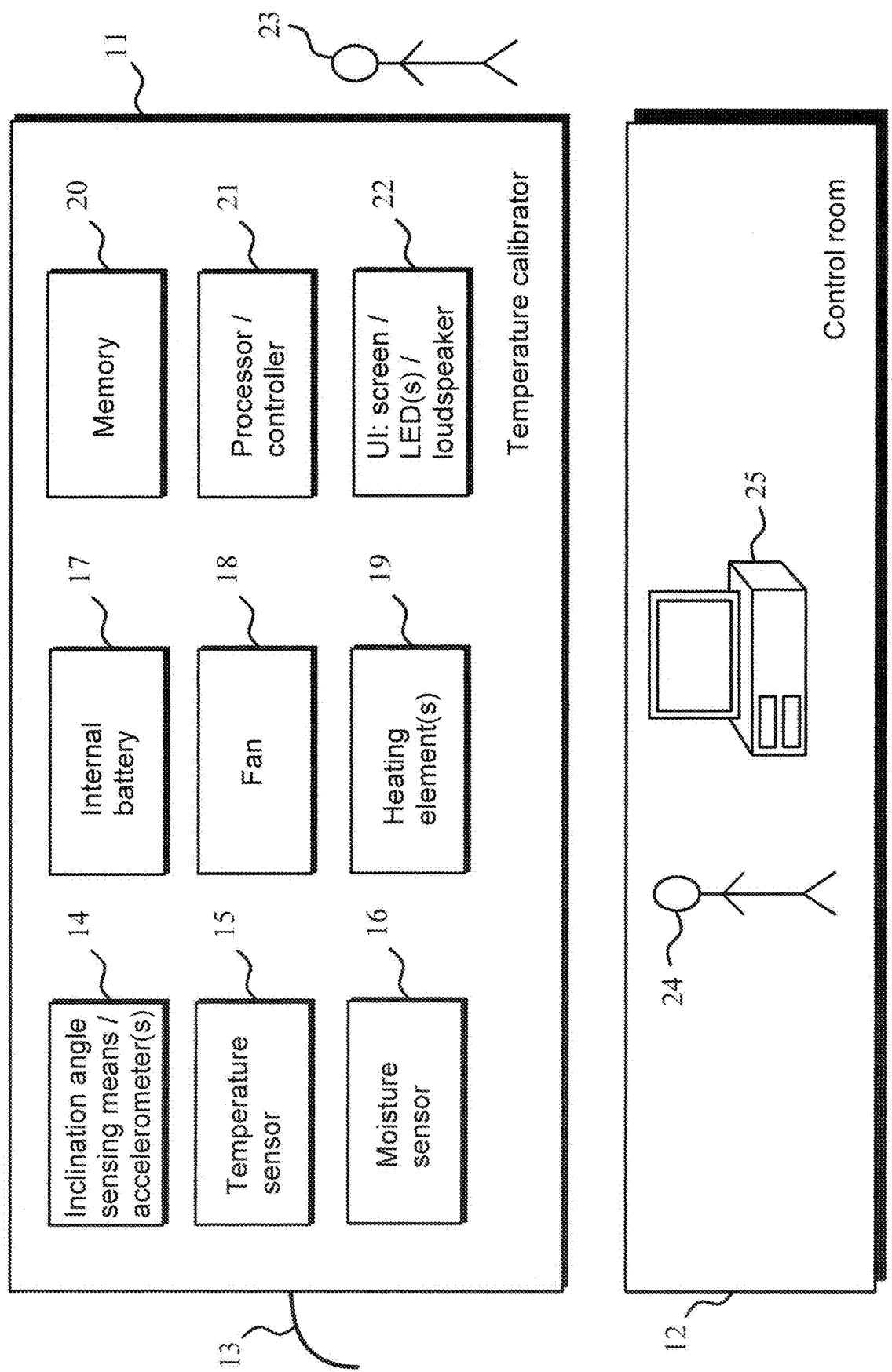
FIG. 1 illustrates an example of the system comprising a temperature calibrator and means for indicating a possible safety hazard concerning its use.

FIG. 1 illustrates an example of the system comprising a temperature calibrator 11 and means for indicating a possible safety hazard concerning its use.

The system comprises a temperature calibrator 11 in the field and also a monitoring or control room 12 is shown. The temperature calibrator 11 is connected to mains power 13. The temperature calibrator 11 comprises inclination angle sensing means 14, which in an embodiment can be an accelerometer. The temperature calibrator 11 also comprises a temperature sensor 15. Note that the internal reference sensor in the dry block is a different element than the temperature sensor 15. In an embodiment, the temperature calibrator 11 is also provided with a moisture (sensing) sensor 16, e.g. mounted on the surface of the housing of the temperature calibrator 11. The temperature calibrator 11 comprises an internal battery 17 for supplying power in situations where the mains power 13 is cut off. The internal battery power is meant for regular calibrator functionalities, except for the actual heating of the heating elements where mains power is required. The temperature calibrator 11 comprises heating elements 19 where the heating elements 19 are prior art elements in regular temperature calibrators for maintaining the temperature set-point. A fan 18 is provided in the system so that it cools quickly down the temperature of the temperature calibrator 11. In more detail, the fan 18 may be placed in the "thermodynamic core" of the device (i.e. close to the metal block, which is heated by the resistive heater(s)). In further embodiments, it is possible to have even auxiliary fans for cooling down the other parts of the device. The temperature calibrator 11 comprises a processor 21 and a memory 20 for controlling the device through algorithmic steps, and also for performing estimations and for directing certain processes, such as an automated heater dry-out process, see elsewhere in the description. The processor also controls regular functionalities of the temperature calibrator 11 in normal calibration procedures in the field, and possible data sending elsewhere in the system (or to a remote device 25 or to a cloud service). The temperature calibrator 11 in the field and/or the remote device 25 in the control room 12 comprise a UI 22 (i.e. a user interface) which may comprise several means of informing status and information to the client. The UI may be a regular screen or a touch screen (for user inputs as well), where the screen may present warning message(s) to the temperature calibrator user 23. Similarly, the remote device 25 comprises a screen which may present warning message(s) to the manager 24 of the system in the control room 12. The temperature calibrator's 11 UI 22 may comprise at least one LED for showing a warning light to the user 23, when the predetermined temperature limit has been exceeded. For instance, the LED may provide red light as the warning light or signal. The temperature calibrator's 11 UI 22 may comprise a loudspeaker which may give beeping sound(s), when the predetermined temperature limit has been exceeded. The beeping means can also be present in the control room as well, together with a LED system informing various statuses of the operations within the facility. Such LEDs within the control room thus may inform also the heat situation of the temperature calibrators 11 in the field. Of course, instead of the touch screen, the temperature calibrator 11 may comprise a traditional keyboard together with a regular screen, these two as part of the UI 22.

Concerning the embodiment applying a moisture (sensing) sensor 16, we note the following. It would mean that the moisture (sensing) sensor 16 would need to monitor the ambient humidity the calibrator is exposed to over time when it is not heating or when it is switched off. Primarily this would be done when the device is switched off. Based on advanced estimations, it would maybe be possible to predict when the heaters have absorbed too much moisture so that they would probably need a dry-out process.

Such a method might work, but in another embodiment, the system may let the user to be responsible for activating the dry-out process, when he/she thinks it is needed, or if the building's Residual Current Device is tripping, when the dry block heating is started. When it is manually started, the dry-out process itself is automatic. In this latter embodiment concerning moisture, a low power is simply applied to the heaters, so that the leakage current remains low. The device monitors the calibrator block temperature and when it reaches a temperature somewhat over 100° C., the dry-out process is automatically stopped and the user is informed of the end of the dry-out process.

In other words concerning the previous paragraph, the system may let the user 23 to activate an automated heater dry-out process when it is considered that the temperature calibrator 11 locates in a moist ambient environment, and then the system will apply the automated heater dry-out process within the temperature calibrator 11, which automated heater dry-out process comprises relatively slow heating of the heating elements 19, as described in the previous paragraph.

Other dry blocks (meaning the ones in prior art) do not have an automated dry-out feature, and thus, they require the user to use the normal dry block functionality; i.e. to initially set a low temperature set-point (requiring low power=>low leakage current) and then slowly increasing the set-point until the moisture has evaporated completely. This is time-consuming manual work. Thus, the principle from the embodiment above (concerning the automatic dry-out process) removes this defect, and it is thus advantageous.

Concerning FIG. 1, the functionalities of shown different physical entities in the temperature calibrator 11 or in connection to it, and also concerning the control room 12 or other remote location, are discussed extensively elsewhere in the detailed description.

In an embodiment of the invention, if the measured inclination angle is in a moderate range, the user can be warned e.g. by a sound or by showing a message box in a user interface. The sound creating means and the user interface may in general locate in the temperature calibrator itself but also in a control room of the facility when the temperature calibrator may locate e.g. in a plant or in an automated production line within the facility. In yet another embodiment, the sound creating means and the user interface may locate remotely in a form of an external computer or server connected to the facility via internet.

Figure 2C:
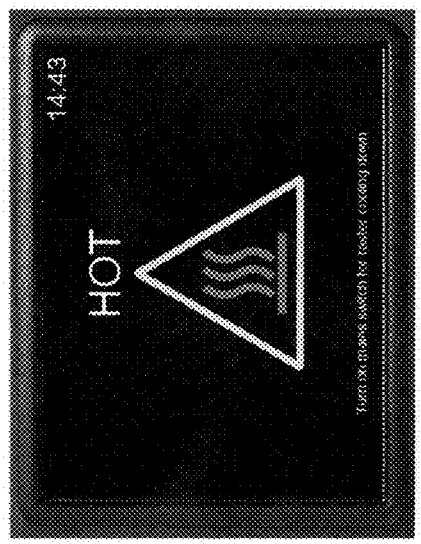
FIGS. 2a-c illustrate various warning, error or excessive heat related messages on the screen of the calibrator device.
Figure 2B:
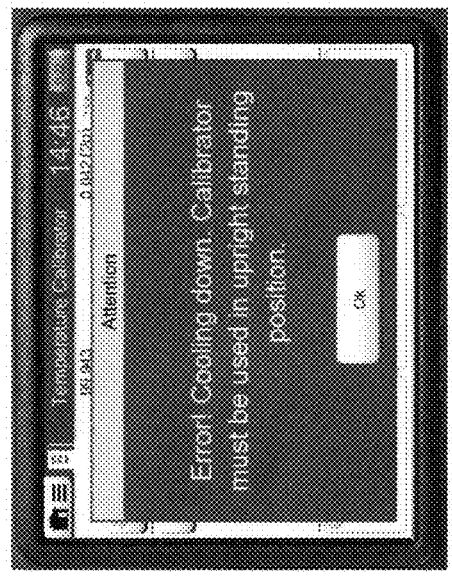
Figure 2A:

FIG. 2a illustrates a warning message box on the screen of the calibrator device, in an embodiment of the present invention. It informs and warns the user that "calibrator must be used in upright standing position". The user may acknowledge the reading of the message by pressing "Ok" from the UI (keyboard/touchscreen/button) of the device.

If the measured inclination angle is decided to be in a high range so that there is a risk of falling or tipping the temperature calibrator over, the heating power must be stopped and the fan in the temperature calibrator is started. The high range means angles exceeding a certain angular threshold value, if the upright position is defined as an angular deviation of 0 degrees. Starting the fan will force the hot air to escape through an intended air outlet opening and cool down the temperature calibrator quickly.

In this situation, the calibrator device may show an "error" message box informing the user of the ongoing cooling action, like in an exemplary screen capture of FIG. 2b. The message on the screen can read as "Error! Cooling down. Calibrator must be used in upright standing position." Thus, the error message box also gives important guidance to the user as well, concerning the operation of the device. Of course, the messages in FIGS. 2a and 2b can be formulated in any other desired manner (meaning the used wordings) and in any desired language as well.

Another source of hazard is using the temperature calibrator at too high ambient temperature or if there is a restriction of the airflow in air inlet channels of the temperature calibrator. This will cause the internal temperature of the temperature calibrator, and especially the temperature of the internal battery, to get very high, if the temperature calibrator is at the same time in its highest temperature setpoint, or near that setpoint. If the internal temperature of the temperature calibrator is monitored, these situations can be detected and corrected before a hazardous situation occurs.

In an embodiment of the invention, there is applied a temperature monitoring system, that measures the internal temperature of the temperature calibrator close to the most critical components, and the temperature monitoring system stops heating the heating elements of the temperature calibrator if too high temperature is detected, i.e. a temperature exceeding a predetermined temperature threshold value.

In practice, this means also that at the same ambient temperature, the device can be used normally if its temperature set-point is lower. In an embodiment, the temperature monitoring system comprises an integral temperature sensor. In this embodiment comprising the internal temperature monitoring, the fan must not be started, since the high temperature might be caused by restricted airflows around the temperature calibrator, which might cause airflows within the temperature calibrator to behave in an unexpected manner.

The temperature calibrator should never be left unattended if the temperature calibrator is hot. It must never be packed inside a carrying case or a transport case if the temperature calibrator is hot. In a basic temperature calibrator, the user has no means to detect the temperature of the temperature calibrator after the calibrator has been switched off; at least when discussing electric sensing or other "remote" sensing means of the temperature. Of course, in practice, the user might use his/her own hand without a glove for "human sensing", and that would give a hint whether the temperature is sensible or too hot. Of course, there is a risk for skin burns if the temperature is too hot, and the user does not act cautiously. Thus, in an embodiment of the invention, the temperature calibrator is equipped with an internal battery, that would be used for powering the temperature measurement system or the fan powering system or both these systems. If a high temperature is detected after the mains power has been switched off, a fan can be used to cool down the temperature calibrator until the measured temperature is considered to be within safe limits. After this, the temperature calibrator can be automatically shut down. When applying this embodiment, the temperature calibrator can never be left hot.

As already mentioned above, an internal battery is used for powering the temperature measurement system, in an embodiment. If the temperature within the temperature calibrator is measured even after switching off the mains power from the temperature calibrator, the user could be warned of a high temperature present in the calibrator. An applied warning method can be e.g. a message box in the user interface (e.g. a screen in the temperature calibrator, or a screen elsewhere in a remote device or in a control room) or a warning led (in the temperature calibrator or elsewhere in a remote device), or a beeping or other kind of a distinctive sound provided by the temperature calibrator itself or by a loudspeaker in the control room premises, for instance.

FIG. 2c illustrates one example of such a warning message box on the screen of the device. It may say: "HOT. Turn on mains switch for faster cooling down." This means that, in this embodiment, the fan will activate only when the mains power is switched on to the device. The advantage of such messaging is that the user is able to instantly see that the device is dangerously hot to touch.

This relates to an embodiment where the internal battery 17 is used because the mains power 13 is switched off. In case of a temperature exceeding the predetermined temperature threshold value is sensed by the temperature sensor 15, the device will warn a user 23 or manager 24 of the temperature calibrator 11 through a visual or audio indication 22 about the high temperature. The indication is then available in the temperature calibrator 11 itself, or via a remote device 25. In this situation, the temperature is high but the battery 17 can't power the fan 18. The battery can for instance be almost empty, or the fan can't simply be powered by the battery based on design reasons within the device. In this case, the device may at least warn the user 23 (or manager 24) by showing a warning message box, such as the one in FIG. 2c, for instance.

In an embodiment, the internal battery is used for powering a processor, which predicts the temperature of the temperature calibrator based on the latest measured temperature by a calculation algorithm. The calculation algorithm may apply extrapolation based on earlier results saved in a memory 20 of the temperature calibrator 11 (or to a remote device or cloud), and based on earlier temperature behavior of the same particular temperature calibrator unit, or of the same type of temperature calibrators. In other words, when powering the processor 21 by the internal battery 17 (when mains power 13 is off), the processor 21 will predict a current temperature of the temperature calibrator 11 based on one or several earlier temperature measurement results of the same temperature calibrator 11 and/or of another temperature calibrator being the same type of device with the temperature calibrator 11. By type, we mean a certain model of a dry block. Thus, the algorithm may use results made by the same dry block unit, or by another dry block unit (but still within the same model) used in similar circumstances, or by both.

Still referring to the previous embodiment, the processor 21 may be the internal processor of the temperature calibrator itself, thus allowing the temperature calibration to function in this regard also without the mains power 13 supply. Also in this embodiment, the user can be warned of high temperature by any appropriate means (see the above listed ways). One possibility is the message according to FIG. 2c.

In the last two embodiments, any user will always be aware of the hot temperature calibrator, even if another user has switched off the temperature calibrator. This is an advantage based on the improvement of the transfer of relevant heat related data, and thus, this enhances safety in multi-user environments often present within factories, plants and large automation lines. Powering the temperature calibrator from the internal battery can automatically start the fan to cool down the temperature calibrator, where the quickness of the cooling process is an advantage in this regard.

If the temperature calibrator is stored in a high humidity environment, resistive heaters can collect moisture. If such a device is heated too quickly, the leakage current in the resistive heaters can get too high. If the resistive heaters have collected moisture, the heaters need to be heated very slowly to allow them to dry out. In an embodiment of the invention, there is applied an automated heater dry-out process in the processor. When the automated heater dry-out process is started, it automatically dries out the resistive heaters in a safe way, which will not cause high leakage currents. This is an advantage of such a process.

The upper limit of the predetermined safe temperature range is the same as the predetermined temperature threshold value.

The heating elements 19 used in temperature calibrator 11 are resistive heaters in an embodiment. They are in practice electrical resistors which are supplied by an electrical current, meaning that the passing current will transform into heat within the resistor elements (one or more of them can be used).

As a conclusion, the present invention is taking the safety systems further than the standardized requirements mentioned in the background.

The disclosed steps and actions can be implemented by a computer program which can be executed in a processor 21 of the temperature calibrator 11, or in a remote device 25 which is part of the disclosed system. The remote device 25 may be a server or PC in a monitoring or control room of the facility. A computer program product is also an aspect of the invention, besides the computer program itself.

The present invention is not restricted merely to embodiments presented above, but the scope of protection for the present invention is determined by the claims.

The invention claimed is:

1. A method of sensing a safety hazard within or related to a temperature calibrator, and informing the safety hazard to a user or manager of the temperature calibrator, wherein the method comprises the step of:

sensing an inclination angle of a housing of the temperature calibrator and temperature within or on the housing of the temperature calibrator, and if at least a sensed inclination angle or temperature exceeds a predetermined threshold value indicating a possible safety hazard,
switching off heating elements within the temperature calibrator, and
showing a warning information either locally on the temperature calibrator or via a remote device accessed by the user or the manager of the temperature calibrator.

2. The method according to claim 1, wherein the sensing of the temperature in the temperature calibrator is performed by a temperature sensor, which is supplied by an internal battery within the housing of the temperature calibrator, supplying energy to the temperature sensor even when mains power of the temperature calibrator is not available.

3. The method according to claim 1, wherein the sensing of the inclination angle is configured to be performed by at least one accelerometer within or on the housing of the temperature calibrator.

4. The method according to claim 1, wherein in case the sensed inclination angle stays in a predetermined moderate range above the safety limit for the angle,
   warning the user or the manager by a visual or audio indication from the temperature calibrator, or via a remote location connected to the temperature calibrator.

5. The method according to claim 1, wherein in case the sensed inclination angle stays in a predetermined high range above the moderate range, in addition of stopping heating power in the heating elements of the temperature calibrator, starting a fan of the temperature calibrator.

6. The method according to claim 2, wherein in case of a temperature exceeding the predetermined temperature threshold value is sensed by the temperature sensor, and if the mains power is switched off,
   starting a fan of the temperature calibrator, the fan supplied by energy from the internal battery.

7. The method according to claim 6, wherein when the temperature reaches again a predetermined safe temperature range after the fan has cooled the temperature calibrator, shutting the temperature calibrator down.

8. The method according to claim 2, wherein in case of a temperature exceeding the predetermined temperature threshold value is sensed by the temperature sensor, and if the mains power is switched off,
   warning a user or manager of the temperature calibrator through a visual or audio indication about the high temperature, the indication available in the temperature calibrator itself, or via a remote device.

9. The method according to claim 2, wherein the method further comprises the steps of:
   powering a processor of the temperature calibrator by the internal battery when mains power is off, where
   predicting, by the processor, a current temperature of the temperature calibrator based on one or several earlier temperature measurement results of the same temperature calibrator and/or of another temperature calibrator being the same type of device with the temperature calibrator.

10. The method according to claim 1, wherein the method further comprises the steps of:
    sensing moisture level in the premises of the temperature calibrator by a moisture sensing sensor, and when the ambient environment of the temperature calibrator is considered to comprise moisture above a predetermined threshold,
    applying an automated heater dry-out process within the temperature calibrator, which automated heater dry-out process comprises relatively slow heating of the heating elements.

11. The method according to claim 1, wherein the method further comprises the steps of:
    letting the user to activate an automated heater dry-out process when it is considered that the temperature calibrator locates in a moist ambient environment, and
    applying the automated heater dry-out process within the temperature calibrator, which automated heater dry-out process comprises relatively slow heating of the heating elements.

12. A temperature calibrator for sensing a safety hazard within or related to a temperature calibrator, and informing the safety hazard to a user or manager of the temperature calibrator, wherein the temperature calibrator comprises heating elements,
    wherein the temperature calibrator further comprises or is in connection to:
      inclination angle sensing means for sensing an inclination angle of a housing of the temperature calibrator,
      a temperature sensor for sensing temperature within or on the housing of the temperature calibrator,
      and if at least a sensed inclination angle or temperature exceeds a predetermined threshold value indicating a possible safety hazard,
        the temperature calibrator is configured to switch off the heating elements, and
        the temperature calibrator is configured to show a warning information either locally on the temperature calibrator or by transmitting the warning information to a remote device accessed by the user or the manager of the temperature calibrator.

13. A computer program product for sensing a safety hazard within or related to a temperature calibrator, and informing the safety hazard to a user or manager of the temperature calibrator, the computer program product comprising program code and executable in a processor, wherein the computer program product is configured to execute the steps of:
    sensing an inclination angle of a housing of the temperature calibrator and temperature within or on the housing of the temperature calibrator, and if at least a sensed inclination angle or temperature exceeds a predetermined threshold value indicating a possible safety hazard,
    switching off heating elements within the temperature calibrator, and
    showing a warning information either locally on the temperature calibrator or via a remote device accessed by the user or the manager of the temperature calibrator.

* * * * *